Figure 1:
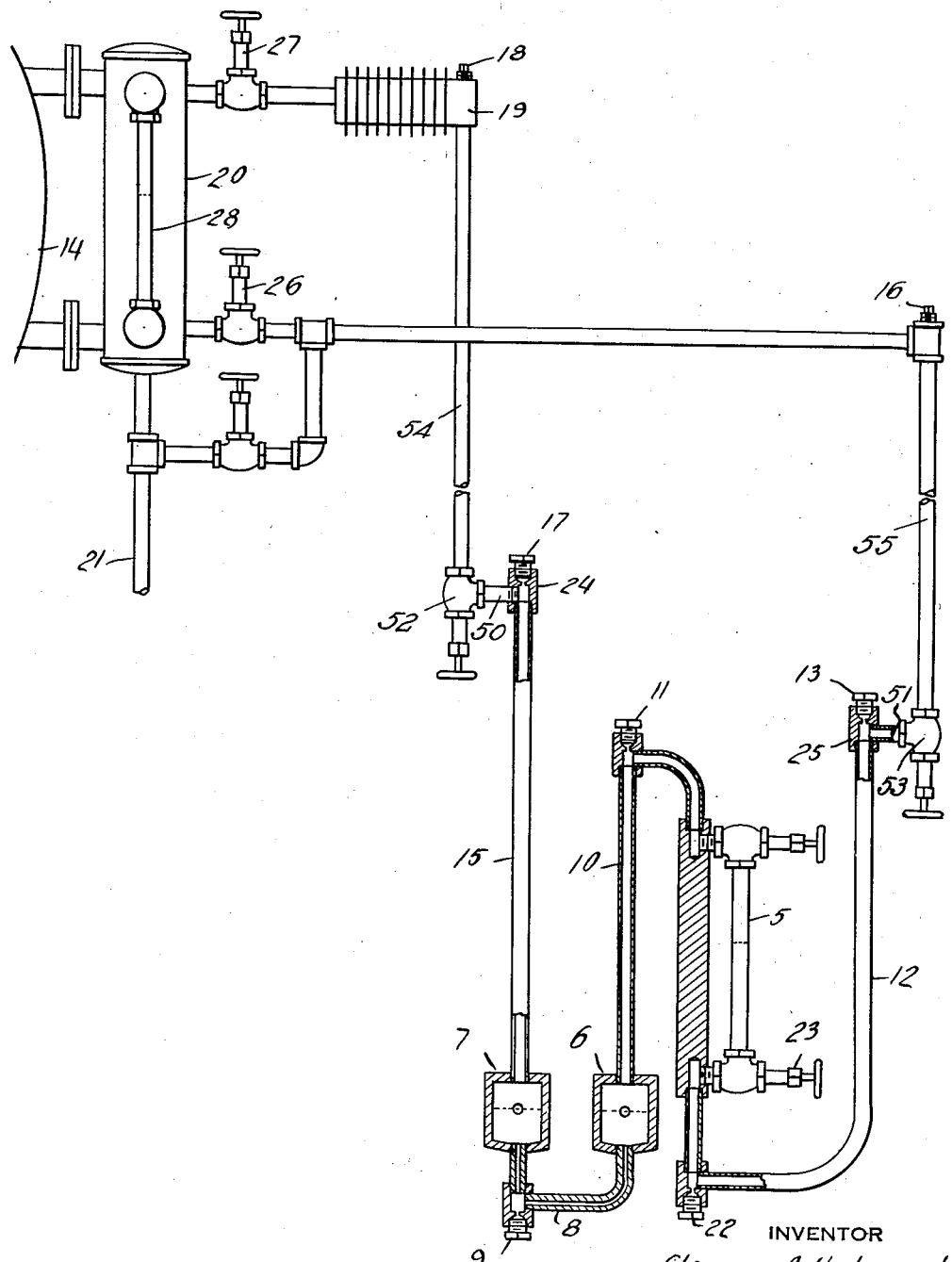

Aug. 2, 1932.　　　C. A. UNDERWOOD　　　1,869,400
MEASUREMENT OF PRESSURE DIFFERENTIALS
Filed June 12, 1930　　　3 Sheets-Sheet 1

INVENTOR
Clarence A. Underwood
BY
ATTORNEYS

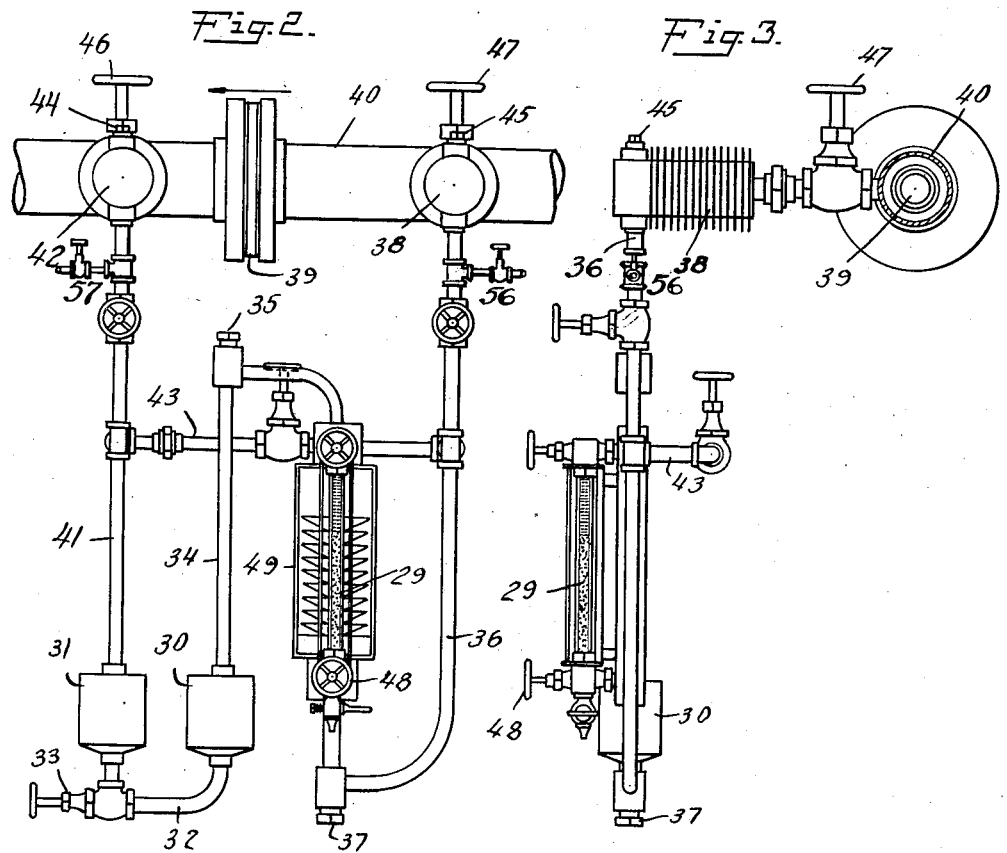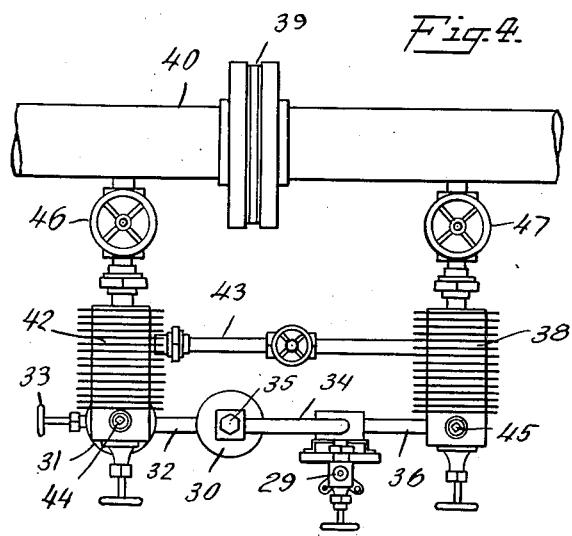

Aug. 2, 1932.  C. A. UNDERWOOD  1,869,400
MEASUREMENT OF PRESSURE DIFFERENTIALS
Filed June 12, 1930  3 Sheets-Sheet 3

Fig.5.

INVENTOR
Clarence A. Underwood
BY
Pennie, Davis, Marvin Edmonds
ATTORNEYS

Patented Aug. 2, 1932

1,869,400

UNITED STATES PATENT OFFICE

CLARENCE A. UNDERWOOD, OF EAST CHICAGO, INDIANA

MEASUREMENT OF PRESSURE DIFFERENTIALS

Application filed June 12, 1930. Serial No. 460,654.

This invention relates to improvements in instruments for measuring differentials in fluid pressures, particularly as applied for indication of liquid levels and rates of fluid flow.

Modern steam power plant practice has developed a necessity for remote water level indicators of extreme dependability and accuracy; increasing operating pressures and increasing evaporation rates have made water levels more critical and at the same time the height of boiler settings above firing floor levels has been increasing. This invention provides particularly a remote water level indicator of unusual simplicity meeting the requirements of such service.

The improvements of the invention are, however, of broader application; they are useful in connection with the indication of liquid levels generally and in connection with the indication of rates of flow generally, of steam flow through a pipe for example.

The improved instrument of this invention consists essentially of a gauge glass and a pair of closed wells containing mercury connected below the normal mercury level, the upper end of the gauge glass being connected to the upper part of one of the closed wells, a direct connection between the upper part of the other of the closed wells and the lower pressure region and a direct connection between the lower end of the gauge glass and the higher pressure region, means for maintaining both of these direct connections full of liquid, and a volume of liquid, immiscible with the mercury and with the first mentioned liquid and visually distinct from the first mentioned liquid, filling the connection between the upper end of the gauge glass and the connected well, the upper part of that well above the mercury and the upper end of the gauge glass and normally establishing a meniscus in the gauge glass.

As applied for indication of boiler water level, the lower end of the gauge glass is connected directly to the boiler at a point below the normal boiler water level and the upper part of the second closed well is connected directly to the boiler at a point above the normal boiler water level through a condenser arranged at the high point of the connection and proportioned to maintain this connection full of water by condensation of steam irrespective of displacements due to variations in water level.

As applied for indication of rates of fluid flow, steam flow for example, an orifice is inserted in the pipe through which flow is to be measured, the lower end of the gauge glass is connected directly to this pipe on the high pressure side of the orifice through a condenser proportioned to maintain this connection full of water, and the upper part of the second closed well is connected directly to this pipe through a condenser proportioned to maintain this connection full of water.

The invention will be described in more detail in connection with the accompanying drawings which illustrate one form of water level indicator and one form of fluid flow indicator embodying the invention. It is intended and will be understood that this more detailed description and illustration are for the purpose of exemplification.

In the accompanying drawings:

Fig. 1 is an elevation partly in section and with parts broken away of a water level indicator embodying the invention as connected to a boiler, Fig. 2 is an elevation with parts broken away of a fluid flow indicator embodying the invention as connected to a pipe the flow through which is to be measured, Fig. 3 is a side elevation of the instrument illustrated in Fig. 2, and Fig. 4 is a plan of the instrument illustrated in Fig. 2.

Fig. 5 is an elevation of a water level indicator embodying the invention and connected to a boiler similar to that illustrated in Figure 1 except that the arrangement provides for installation of the instrument at a point above that at which the pressure is to be measured.

Referring to Fig. 1, the boiler water level indicator illustrated comprises a gauge glass 5, a pair of closed wells 6 and 7 connected by a passage 8 including a drain plug 9, a connection 10 including a movable plug 11 between the upper part of the well 6 and the upper end of the gauge glass 5, a direct connection 12 including a drain plug 22 and removable plugs 13 and 16 between the lower end of the gauge glass 5 and the boiler 14, at a point below the normal boiler water level, and a direct connection 15 including removable plugs 17 and 18 and a condenser 19 between the upper part of the well 7 and the boiler 14, at a point above the normal boiler water level. The connections may, as illustrated, be connected directly to the lower and upper parts respectively of the usual gauge column 20. The usual gauge column blowdown line is indicated at 21.

With the instrument arranged as illustrated in Fig. 1, it is put in operation as follows: With the valves 26 and 27 closed, the drain plugs 9 and 22 are fitted tightly in place and the plugs 17, 11, and 13 are removed. The wells 6 and 7 are half-filled (as indicated in the drawings) with mercury through plug 11. Water is poured through plug 13 until a water level just shows in the lower end of the gauge glass 5 and the valve 23 is then closed. A liquid immiscible with mercury and with water and visually distinct from water is poured through plug 11 until it overflows and the plug 11 is then fitted tightly in place. Water is poured through plugs 17 and 13 until it overflows, at levels fixed by the levels of the upper faces of the fittings 24 and 25 respectively, and the plugs 17 and 13 are then fitted tightly in place. With the valves 26 and 27 still closed, water is poured through plugs 18 and 16 until it overflows and these plugs are then fitted tightly in place. Valve 23 is then opened and the water level in the gauge glass 5 is again brought to a point such that it is just visible in the lower end of the gauge glass by permitting, if necessary, a slow escape of sufficient liquid from connection 10 through the plug 11. The plug 11 having been fitted tightly in place again, the valves 26 and 27 are thereupon opened and the meniscus in the gauge glass 5 immediately assumes a position corresponding to the meniscus in the gauge glass 28 of the usual gauge column 20. Once placed in operation, the condenser 19 maintains the connection 15 full of water thus maintaining a constant head over the mercury in the well 7 against which fluctuations in water level are balanced through the connection 12 by displacement of the mercury with corresponding displacement of the meniscus in the gauge glass 5.

The wells 6 and 7 are carefully machined inside to have the same area of internal horizontal section throughout. By proportioning the area of this section to the area of the internal horizontal section of the gauge glass 5, variation in water level in the boiler may be indicated by an identical variation in level of the meniscus in the gauge glass 5 or by a magnified or diminished variation in level of this meniscus. The fittings 24 and 25 are advantageously positioned so that the difference in water level between their upper faces corresponds to the maximum difference in level to be indicated in the gauge glass 5. When so arranged, the instrument may be put in operation with a minimum of difficulty, as just described, by bringing it to a normal equilibrium against the extreme levels fixed by the position of these fittings.

For use in water level indicators embodying the invention, as just described, or in other applications of the invention involving contact with water, the liquid establishing the meniscus in the gauge glass 5 may consist of a mixture of equal parts of kerosene and light lubricating oil colored, if necessary, by the addition of very small amounts of anilin. In such applications and in other applications of the invention the choice of a liquid immiscible with mercury and with the liquid filling the connections to the instrument and visually distinct from the latter is determined by the chemical and physical properties of the latter liquid.

Referring to Figs. 2, 3 and 4, the steam flow indicator illustrated comprises a gauge glass 29, a pair of closed wells 30 and 31 connected by a passage 32 including a needle valve 33, a connection 34 including a removable plug 35 between the upper part of the well 30 and the upper end of the gauge glass 29, a connection 36 including a drain plug 37 and a condenser 38 between the lower end of the gauge glass 29 and the high pressure side of the orifice 39 in the steam line 40, and a connection 41 including a condenser 42 between the upper part of the well 31 and the low pressure side of the orifice 39 in the steam line 40. A by-pass connection 43 between the connections 41 and 36 is provided to facilitate adjustment of the instrument. Needle valves 56 and 57 are advantageously provided in connections 36 and 41, respectively.

With the instrument arranged as illustrated in Figs. 2, 3 and 4, it is put in operation as follows: With the plugs 44 and 45 out, with the needle valve 33 open, or partly open, with the by-pass 43 closed and with the valves 46 and 47 closed, the wells 31 and 30 are half-filled with mercury through the plug 35. Water is then poured through the plug 45 until a water level just shows in the lower end of the gauge glass 29. The valve 48 is then closed. A liquid immiscible with mercury and with water and visually distinct from water is then poured through the plug 35 until it overflows and the plug 35 is fitted tightly in place. Water is then poured through the plug 44 until it overflows and the plugs 44 and 45 are fitted tightly in place. Valve 48 is then opened, and, if necessary, sufficient liquid is permitted to escape through the plug 35 again to make the water level in the gauge glass 29 just visible at the lower end. The valves 46 and 47 are then opened in this order, valve 47 being opened slowly. The needle valve 33 is adjusted to eliminate surging or oscillation within the instrument.

The indication in the gauge glass 29 of the pressure differential across the orifice 39 is an indication of rate of flow through the orifice. The scale 49 may be calibrated to meet any particular requirement. By properly proportioning the ratio of the area of the internal horizontal section of the wells 31 and 30 and the area of the internal horizontal section of the gauge glass 29, the relative displacement of the meniscus in the gauge glass 29 may be magnified or diminished as desired. In this way, low rates of flow may be measured accurately with large orifices, eliminating the introduction of large losses through resistance to flow through the orifice, since the instrument will magnify the smaller pressure differentials resulting from the use of larger orifices.

The improved instrument of the invention can be installed at convenient distances from the point in any system to which it is connected. It may also be installed above or below the level of such a point of connection. If installed above, the connections between the instrument and the system should include suitable traps or seals.

With the instrument arranged as illustrated in Fig. 5, it is put in operation exactly as described in connection with the instrument illustrated in Fig. 1 except that the valves 52a and 53a should be initially closed and remain closed until all of the connections have been filled and the instrument is ready to be placed in actual operation. The instrument illustrated in Fig. 5 is substantially identical with Fig. 1 except that the corresponding parts have been identified by the same reference numerals with the letter "a" appended thereto. The instrument illustrated in Fig. 5 differs from the instrument illustrated in Fig. 1 only in that connections 50a and 51a are extended upwardly to raise the instrument to any desired height. In this arrangement the lower portion of connections 50a and 51a together with connections 54a and 55a form suitable traps or seals which serve to prevent escape of liquid from the connections.

The means provided in the instruments illustrated in the accompanying drawings for maintaining the connections between the instrument and the system to which it is connected full of liquid consist of a condenser or condensers providing liquid by condensation of vapor derived from the system, by the condensation of steam in the applications illustrated. As applied to systems not containing condensible vapor, indication of the rate of flow of a non-condensible gas through the pipe 40 in the apparatus illustrated in Figs. 2, 3 and 4 or indication of a water level in a cold tank or reservoir with apparatus similar to that illustrated in Fig. 1 for example, a liquid may be supplied to either or both of the connections between the instrument and the system, as may be necessary, at a rate sufficient to maintain these connections full of liquid, for example, from a source of a liquid under higher pressure through needle valves 56 and 57 opening into the respective connections. As applied to indication of the rate of flow of a liquid with apparatus similar to that illustrated in Figs. 2, 3 and 4 for example, the liquid itself, under the pressure in the system, may fill and maintain full the connections between the instrument and the system.

The improved instrument of the invention is useful for indication of water level in boilers and feed water heaters and hot wells, of liquid level in stills, of liquid level in tanks and reservoirs, of the rate of flow of gas or liquid through pipes, of the pressure drop through filters, and so forth.

I claim:

1. An instrument for measuring pressure differentials comprising a gauge glass, a pair of closed wells containing mercury and connected below the normal mercury level, a connection between the upper end of the gauge class and the upper part of one of the closed wells, a direct connection between the upper part of the other of the closed wells and the lower pressure region, a direct connection between the lower end of the gauge glass and the higher pressure region, means for maintaining both of these direct connections full of liquid, and a volume of liquid, immiscible with the mercury and with the first-mentioned liquid and visually distinct from the first-mentioned liquid, filling the connection between the upper end of the gauge glass and the connected well, the upper part of that well above the mercury and the upper end of the gauge glass and normally establishing a meniscus in the gauge glass.

2. In combination with a boiler, the instrument defined in claim 1, the connection from the lower end of the gauge glass being arranged to communicate directly with a point in the boiler below the normal water level therein, and the connection between the upper part of the mercury well leading directly to the region of lower pressure and being connected to the boiler at a point above the normal water level therein, said last mentioned connection including a condenser.

3. In combination with an orifice in a pipe the rate of flow through which is to be measured, the instrument defined in claim 1, the connection from the lower end of the gauge glass being arranged to communicate directly with a point in the pipe on the upstream side of the orifice and the connection between the upper part of the mercury well leading directly to the region of lower pressure being arranged to communicate directly with a point in the pipe on the downstream side of the orifice.

In testimony whereof I affix my signature.

CLARENCE A. UNDERWOOD.